US012466981B2

(12) United States Patent
Garra et al.

(10) Patent No.: US 12,466,981 B2
(45) Date of Patent: Nov. 11, 2025

(54) CURABLE TWO-PART ADHESIVE COMPOSITION

(71) Applicant: BOSTIK SA, Colombes (FR)

(72) Inventors: Patxi Garra, Barcelona (ES); Marta Rodriguez Ble, Barcelona (ES); Jordi Solera Sendra, Barcelona (ES); Marc Escriba Pla, Barcelona (ES)

(73) Assignee: BOSTIK SA, Colombes (FR)

( * ) Notice: Subject to any disclaimer, the term of this patent is extended or adjusted under 35 U.S.C. 154(b) by 482 days.

(21) Appl. No.: 18/005,377

(22) PCT Filed: Jul. 20, 2021

(86) PCT No.: PCT/EP2021/070278
§ 371 (c)(1),
(2) Date: Jan. 13, 2023

(87) PCT Pub. No.: WO2022/018087
PCT Pub. Date: Jan. 27, 2022

(65) Prior Publication Data
US 2023/0265320 A1 Aug. 24, 2023

(30) Foreign Application Priority Data
Jul. 22, 2020 (EP) ..................................... 20305840

(51) Int. Cl.
*C09J 133/08* (2006.01)

(52) U.S. Cl.
CPC ................... *C09J 133/08* (2013.01)

(58) Field of Classification Search
CPC ......... C09J 133/08; C09J 4/00; C08K 5/0016; C08K 5/0091; C08F 222/322
See application file for complete search history.

(56) References Cited

U.S. PATENT DOCUMENTS

| | | |
|---|---|---|
| 3,260,637 A | 7/1966 | Bramer |
| 3,836,377 A | 9/1974 | Delahunty |
| 4,460,758 A | 7/1984 | Peiffer et al. |
| 5,066,743 A | 11/1991 | Okamoto et al. |
| 5,110,392 A | 5/1992 | Ito et al. |
| 6,001,213 A | 12/1999 | Liu |
| 8,981,027 B2 | 3/2015 | Ward et al. |
| 2003/0191248 A1 | 10/2003 | Ryan et al. |
| 2005/0000646 A1 | 1/2005 | Ryan et al. |
| 2011/0196091 A1 | 8/2011 | Zhang et al. |
| 2013/0111036 A1 | 5/2013 | Ozawa et al. |
| 2014/0275419 A1* | 9/2014 | Ward .......................... C09J 4/00 524/879 |
| 2017/0335151 A1* | 11/2017 | Ward ...................... C08L 35/04 |
| 2020/0081750 A1 | 3/2020 | Kuruvilla et al. |
| 2020/0082060 A1 | 3/2020 | Steele |

FOREIGN PATENT DOCUMENTS

| | | | |
|---|---|---|---|
| WO | WO-0118068 A1 * | 3/2001 | .............. C08F 22/32 |
| WO | 2013111036 A1 | 8/2013 | |
| WO | 2015059644 A1 | 4/2015 | |
| WO | 2020082060 A1 | 4/2020 | |

OTHER PUBLICATIONS

ISA/EP; International Search Report and Written Opinion for International Patent Application No. PCT/EP2021/070278 dated Oct. 15, 2021, 9 pages.
Garra et al., Prog. Pol. Sci., 2019, 94, 33.

\* cited by examiner

*Primary Examiner* — Doris L Lee
(74) *Attorney, Agent, or Firm* — Rimon P.C.; Allyn B. Elliott

(57) ABSTRACT

The present invention refers to a curable two-part adhesive composition comprising a first part comprising one or more cyanoacrylate monomer(s), one or more (metha)acrylate monomer(s), a per-compound and, optionally, additives to control viscosity and rheology; and a second part comprising: a non-reactive diluent and a transition metal catalyst, and optionally an electron rich initiator for cyanoacrylates. It also relates to a syringe or a cartridge comprising said two-part curable composition, to the use of such composition for bonding substrates, to the use of such composition filling depressions, cracks or holes in a substrate or between substrates to a method for bonding substrates using said composition, and to a repair method for filling depressions, cracks or holes in a substrate or between substrates using said composition.

15 Claims, No Drawings

CURABLE TWO-PART ADHESIVE COMPOSITION

CROSS-REFERENCE TO RELATED APPLICATIONS

This application is a U.S. National Stage application of International Patent Application No. PCT/EP2021/070278, filed on Jul. 20, 2021, which claims the benefit of European Patent Application No. 20305840.9, filed on Jul. 22, 2020.

CL FIELD OF THE INVENTION

The present invention relates to the field of two-part curable composition based on cyanoacrylates.

BACKGROUND ART

Adhesive compositions based on cyanoacrylate (CA) esters are well-known, e.g. as instant adhesives or so-called 'superglues'. They are popular in many areas of application and are used by consumers, professional craft workers and industrial assemblers. They are solvent free, 100% reactive materials, noted for their ability to form strong adhesive bonds on many different substrates rapidly and without the need of energetic stimuli, such as electromagnetic radiation or heat, to invoke adhesive cure. These attributes are very appealing from the viewpoint of sustainability and end user convenience.

The ability of conventional single-component (1K) CAs to cure, or polymerise, in the process of assembly of most substrate types partly relates to the fact that initiation of the polymerisation process occurs from nucleophilic or ionic species found, under normal circumstances, on most surfaces, e.g., absorbed water, salts, traces of basic materials, etc. When parts to be assembled from substrates such as metals, alloys, ceramics, rubbers, papers, living tissue, leathers and plastics, etc., are placed in contact with a thin layer of liquid cyanoacrylate adhesive in between, a very strong joint results when the adhesive cures solid.

Even though the breadth of substrate types that CA can bond rapidly at room temperature is far superior to any other adhesive class, certain substrates pose challenges, for example the so-called 'low surface energy' substrates, such as polyolefins and 'non-stick' fluorinated polymers. Technical solutions addressed to solve this limitation have been disclosed in the state of the art, such as, for example, U.S. Pat. Nos. 3,260,637, 3,836,377, 4,460,758, 5,818,325, 5,110,392, 5,066,743, 6,001,213, US-A-2003/0191248, or US-A-2005/0000646, wherein the use of activators prior to the subsequent application of the CA composition was proposed.

However, one impediment associated with 1K adhesives relates to the lack of so-called 'cure through volume' (CTV). This limited cure throughout the bulk adhesive in thicker bondlines arises because the most efficient cure occurs closest to the source of initiating species, which are found on the surfaces.

An alternative and more efficient approach to achieve CTV between substrates being assembled when using CA adhesives is one that avoids the dependence on the substrate surfaces only as a source of efficacious initiator. Such an approach instead relies on direct mixing of specific activators contained in a liquid or gel-like carrier into the bulk reactive CA compositions, wherein the mixture of these two separate compositions is then applied to the substrate(s). This approach can offer superior distribution of the activator into the body of the adhesive relative to activating solely from each substrate interface, when the activator is at an appropriate concentration in a compatible carrier. In this context, the admixing components into the bulk adhesive is referred to as a 'two-part', 'two-component', or '2K' approach and such approaches involving CA compositions are well known in the prior art.

A further impediment with CA adhesives is their limited durability since in their common commercial form they are primarily composed of a single monofunctional monomer curing to linear polymer chains.

When describing 2K approaches, it is common to refer to separate components or parts of the adhesive and/or its package, for example as 'Part A', and 'Part B'. Thus, if Part A contains a CA composition in one compartment or reservoir, then Part B may contain compositions selected to activate, react and/or modify physical properties (plasticize, colour, toughen, etc.) of the adhesive that results from mixing the two parts by any means.

Whereas there is clear advantage of uniformly mixing an activating component directly into a CA composition to achieve simultaneous initiation throughout the bulk of the adhesive and thus address the CTV issue, the basic properties of the cured adhesive still rely only on those of linearly polymerised monofunctional CA homopolymers, just as with 1K CA adhesives, except now with improved CTV as disclosed, for example, in US-A-2011/0196091, or CTV and toughness as disclosed, for example, in US-A-2017/0335151. Whilst sufficient for many purposes, and now with some shortcomings addressed such polymers produce adhesives that still have limitations with regard to durability. Attempts to remedy this situation combine the use of (meth) acrylic or epoxy monomers with CAs in 2K embodiments, even if either of both types of mixtures have distinct preferred primary mechanisms of polymerisation. CAs preferably polymerise by electron rich initiators such as nucelophiles, basic materials especially secondary or tertiary amines, phosphines and hard anions or zwitterions at room temperature (RT) whereas acrylic monomers preferably polymerise by redox free-radical initiation at RT and certain epoxies prefer to polymerise cationically at RT. Nevertheless, 2K approaches can be construed that derive some performance gains from interpenetrating networks (IPNs) of mixed independently polymerised monomers or even, in the acrylics case, some copolymerisation, since CAs can also partake in radical polymerisation even if it is not the preferred mechanism. Such approaches are described in the prior art for acrylic 2K-mixtures in, for example, WO-A-2013/111036, WO-A-2020/081750, WO-A-2020/082060 and for epoxy 2K-mixtures in, for example, U.S. Pat. No. 8,981,027.

However, gains in performance compromise the attractive feature of rapid bonding speed of parent CAs in all these cases, so that any enhancement of durability comes with the sacrifice of bonding speed.

Thus, there is still a need to provide an adhesive that retains the speed and multi-substrate bonding attributes of CAs per se, now also with CTV whilst still further displaying significantly enhanced durability especially for use in indoor and outdoor domestic situations.

SUBJECT-MATTER OF THE INVENTION

The subject-matter of the present invention is a two-part curable composition.

Another aspect of the invention relates to a syringe or a cartridge comprising said two-part curable composition.

Another aspect of the invention relates to the use of such composition for bonding substrates.

Another aspect of the invention relates to the use of such composition for filling depressions, cracks or holes in a substrate or between substrates.

Another aspect of the invention is a method for bonding substrates using said composition.

Another aspect of the invention is a repair method for filling depressions, cracks or holes in a substrate or between substrates using said composition.

DETAILED DESCRIPTION OF THE INVENTION

The object of the present invention is a two-part curable composition comprising:
a) a first part (part A) comprising:
  i. at least 50 wt. % of one or more cyanoacrylate monomer(s),
  ii. at least 1 wt. % of one or more (meth)acrylic monomer(s), and
  iii. at least 1 wt. % of a per-compound,
wherein the wt. % is based on the total weight of the first part of the composition,
b) a second part (Part B) comprising:
  i. at least 50 wt. % of a non-reactive diluent, and
  ii. from 0.001 wt. % to 2 wt. % of a transition metal catalyst, expressed as the content of the transition metal,
wherein the wt. % is based on the total weight of the second part of the composition,
wherein the volume ratio between the first part and the second part ranges from 4:1 to 10:1,
with the proviso that the second part does not comprise any vinylic monomer(s).

The inventors of the present invention have developed a two-part curable composition, which surprisingly combines the speed and multi-substrate bonding, cure through volume (CTV) whilst still further displaying significantly enhanced durability especially for use in indoor and outdoor domestic situations.

Throughout the present description and in the claims, the expressions in singular preceded by the articles "a" or "the" are understood to also include, in a broad manner, the reference to the plural, unless the context clearly indicates the contrary.

In the context of the present invention, it is understood that the term "approximately" referred to a determined value indicates that a certain variation for said value is accepted, generally of +/−5%.

The ranges disclosed in this description include both the lower and the upper limit thereof.

The term 'working lifetime' or 'Working Time ("WT")' used throughout the instant description refers to the period between first admixing of an activator into the cyanoacrylate composition and subsequent application of the activated composition to parts, that is the time the activated product resides or remains in the static mixing element (that is used to unite adhesive components and as a dispensing nozzle) itself, i.e., between dispensing operations. Once activator is admixed the curing process begins and continues as the adhesive is dispensed from the static mixing element.

The term 'Open Time' ('OT') refers to the time wherein already activated and subsequently dispensed adhesive remains workable, that is, not substantially cured when applied as a drop, bead, or volume on one substrate, to the extent that it cannot form an effective adhesive bond when used to unite a second substrate. Open time thus describes the period wherein the adhesive remains activated but substantially uncured and ready to usefully bond parts. An adhesive with a long OT refers to one that does not set-up prematurely before parts are assembled even after residing for a relatively long time on single parts.

The term 'Fixture time' ("FT") used in the instant description is a measure of bonding speed defined as the time taken for a bonded assembly, using a minimum quantity of adhesive (a 'small' drop) on two matching substrates to have the ability to suspend a 3 Kg weight for longer than 10 s, when the weight is hung on one end of the bonded assembly in a vertical orientation.

First Part of the Composition—Part A

Cyanoacrylate Monomer(s)

The first part of the composition comprises at least 50 wt. % of one or more cyanoacrylate monomer(s).

In the context of the invention the term cyanoacrylate comprises cyanoacrylate monomers that, in a preferred embodiment, can be represented by the general formula (I):

wherein R is selected from the group consisting of $C_1$-$C_{18}$ linear or branched alkyl chain, $C_3$-$C_{20}$ alkoxyalkyl, trimethylsilylated $C_1$-$C_3$ alkyl chain, furfuryl, allyl, cyclohexyl, and a group having the following formula: —$R^i$—O—C(O)—C($R^j$)=$CH_2$ with $R^i$ being an organic moiety (preferably alkylene group), and $R^j$ being H or $CH_3$.

In one embodiment, cyanoacrylate monomer(s) is/are alkoxyalkyl cyanoacrylate(s) defined by general formula (I), wherein R is defined by the general formula (II):

wherein $R_1$=$CH_3$ or H and $R_2$=$C_1$-$C_4$ linear or branched alkyl, and m ranges from 1 to 3.

The cyanoacrylate monomer(s) may be chosen from the group consisting of 2-methoxyethyl cyanoacrylate, 2-ethoxyethyl cyanoacrylate, 2-(1-methoxy)propyl cyanoacrylate, n-propyl cyanoacrylate, ethyl-2-cyanoacrylate, iso-propyl cyanoacrylate, n-butyl cyanoacrylate, sec-butyl cyanoacrylate, iso-butyl cyanoacrylate, tert-butyl cyanoacrylate, n-pentyl cyanoacrylate, 1-methylbutyl cyanoacrylate, 1-ethylpropyl cyanoacrylate, neopentyl cyanoacrylate, n-hexyl cyanoacrylate, 1-methylpentyl cyanoacrylate, n-heptyl cyanoacrylate, n-octyl cyanoacrylate, n-nonyl cyanoacrylate, n-decyl cyanoacrylate, n-undecyl cyanoacrylate, n-dodecyl cyanoacrylate, cyclohexyl cyanoacrylate, 2-(2'-methoxy)-ethoxyethyl-2"-cyanoacrylate, 2-(2'-ethoxy)-ethoxyethyl-2"-cyanoacrylate, 2-(2'-propyloxy)-ethoxyethyl-2"-cyanoacrylate, 2-(2'-butyloxy)-ethoxyethyl-2"-cyanoacrylate, 2-(2'-pentyloxy)-ethoxyethyl-2"-cyanoacrylate, 2-(2'-hexyloxy)-ethoxyethyl-2"-cyanoacrylate, 2-(2'-methoxy)-propyloxypropyl-2"-cyanoacrylate, 2-(2'-ethoxy)-propyloxypropyl-2"-cyanoacrylate, 2-(2'-propyloxy)-propyloxypropyl-2"-cyanoacrylate, 2-(2'-butyloxy)-propyloxypropyl-2"- cyanoacrylate, 2-(2'-pentyloxy)-propyloxypropyl-2"-cyanoacrylate, 2-(2'-hexyloxy)-propyloxypropyl-2"-cyanoacrylate, 2-(2'-methoxy)-butyloxybutyl-2"-cyanoacrylate, 2-(2'-ethoxy)-butyloxybutyl-2"-cyanoacrylate, 2-(2'-butyloxy)-butyloxybutyl-2"-cyanoacrylate, 2-(3'-methoxy)-propyloxyethyl-2"-cyanoacrylate, 2-(3'-methoxy)-butyloxyethyl-2"-cyanoacrylate, 2-(3'-methoxy)-propyloxypropyl-2"-cyanoacrylate, 2-(3'-methoxy)-butyloxypropyl-2"-cyanoacrylate, 2-(2'-methoxy)-ethoxypropyl-2"-cyanoacrylate, 2-(2'-methoxy)-ethoxybutyl-2"-cyanoacrylate, and mixtures thereof.

Preferably, the cyanoacrylate monomer(s) is/are chosen from the group consisting of ethyl-2-cyanoacrylate, 2-methoxyethyl cyanoacrylate, and mixtures thereof.

Combinations of one or more such cyanoacrylates may be used.

Such monomers of structure (1) can be prepared by methods known by the skilled in the art such as the method described, for example, in U.S. Pat. No. 2,467,927. Some of them, such as ethyl-(ECA) and 2-methoxyethyl cyanoacrylate (MECA) are commercially available.

In the first part of the composition of the invention, the total content of cyanoacrylate monomer(s) may be higher than 50 wt. %, preferably higher or equal to 70 wt. %, and more particularly higher or equal to 80 wt. % based on the total weight of the first part.

In one embodiment, in the first part of the composition of the invention, the total content of cyanoacrylate monomer(s) ranges from 50 wt. % to 99 wt. %, preferably from 70 wt. % to 97 wt. %, and more preferably from 85 wt. % to 95 wt. % based on the total weight of the first part of the composition.

(Meth)Acrylic Monomer(s)

The first part of the composition comprises at least 1 wt. % of one or more (meth)acrylic monomer(s).

In the context of the invention, the (meth)acrylic monomer(s) of Part A of the two-part curable composition, may be chosen from the group consisting of:

a compound of general formula (III)

$$CH_2=CR_3(CO_2R_4) \qquad (III)$$

wherein $R_3$ represents methyl or H (preferably H), and $R_4$ is a hydrogen atom, a $C_1$-$C_8$ linear or branched alkyl, a $C_2$-$C_6$ linear or branched alkoxyalkyl, a furfuryl or an isobornyl group;

a polyfunctional (meth)acrylic ester, such as, for example: butanediol di(meth)acrylate, hexanediol di(meth)acrylate, diethylene glycol di(meth)acrylate, triethyleneglycol di(meth)acrylate, polyethylene glycol di(meth)acrylate, triethylene oxide dimethacrylate, tris-(2-hydroxyethyl) isocyanurate triacrylate, tricyclodecane dimethanol diacrylate, trimethylolpropane tri(meth)acrylate (TMPTA), ethoxylated trimethylolpropane tri(meth)acrylate, neopentylglycol diacrylate, pentaerythritol tetraacrylate (PETA), pentaerythritol tetramethacrylate (PETMA), dipentaerythritol penta(meth)acrylate, dipentaerythritol hexa(meth)acrylate, bisphenol-A-diacrylate, bisphenol-A-dimethacrylate, ethoxylated bisphenol-A-diacrylate, propoxylated bisphenol-A-diacrylate, and mixtures thereof, and mixtures thereof.

In a preferred embodiment, (meth)acrylic monomer(s) of formula (III) is/are selected from the group of methoxyethyl (meth)acrylate and ethoxyethyl (meth)acrylate.

(Meth)acrylic monomers of formula (III) are commercially available from well-known suppliers such as, for example, Sartomer, Arkema, or BASF.

Polyfunctional (meth)acrylic esters are (meth)acrylic esters having more than one functionality, such as a further (meth)acrylic ester. Said polyfunctional (meth)acrylic esters may be esters derived from (meth)acrylic acid and diols or polyols, such as, butanediol, hexanediol, diethylene glycol, triethylene glycol, polyethylene glycol, trimethylolpropane, neopentylglycol, pentaerythritol, bisphenol A, or alkoxylated derivatives thereof.

Said polyfunctional (meth)acrylic esters may also be of relatively low molecular weight such as the commercially available, triethylene oxide dimethacrylate, or butanediol dimethacrylate, or may be of higher molecular weight: (meth)acrylic functionalized oligomers and (meth)acrylic functionalized resins, for example (meth)acrylic ester terminated polymers, such as (meth)acrylic terminated urethane polymers or copolymers or so-called (meth)acrylic ester functionalised telechelic, dendrimeric or hyperbranched materials. Examples of such are available, for example, from the company Sartomer under tradenames CN1993CG, CN2608, CN9210, CN2300 and CN2301.

Preferred polyfunctional (meth)acrylic esters are tricyclodecane dimethanol diacrylate (commercially available as Sartomer SR833S), ethoxylated trimethylolpropane triacrylate (commercially available as Sartomer SR454); 1,4-butanediol dimethacrylate, and tris-(2-hydroxyethyl) isocyanurate triacrylate.

Examples of (meth)acrylic monomers are readily available from well-known suppliers such as, for example, Sartomer, Arkema, and BASF.

The (meth)acrylic monomer(s) of Part A of the two-part curable composition, may be chosen from the group consisting of:

a compound of general formula (III)

$$CH_2=CR_3(CO_2R_4) \qquad (III)$$

wherein $R_3$ represents methyl or H (preferably H), and $R_4$ is a hydrogen atom, a $C_1$-$C_8$ linear or branched alkyl, a $C_2$-$C_6$ linear or branched alkoxyalkyl, a furfuryl or an isobornyl group;

a polyfunctional (meth)acrylic ester, such as, for example: butanediol di(meth)acrylate, hexanediol di(meth)acrylate, diethylene glycol di(meth)acrylate, triethyleneglycol di(meth)acrylate, polyethylene glycol di(meth)acrylate, triethylene oxide dimethacrylate, tris-(2-hydroxyethyl) isocyanurate triacrylate, tricyclodecane dimethanol diacrylate, trimethylolpropane tri(meth)acrylate (TMPTA), ethoxylated trimethylolpropane tri(meth)acrylate, neopentylglycol diacrylate, pentaerythritol tetraacrylate (PETA), pentaerythritol tetramethacrylate (PETMA), dipentaerythritol penta(meth)acrylate, dipentaerythritol hexa(meth)acrylate, bisphenol-A-diacrylate, bisphenol-A-dimethacrylate, ethoxylated bisphenol-A-diacrylate, propoxylated bisphenol-A-diacrylate, and mixtures thereof; (meth)acrylic functionalized oligomers and (meth)acrylic functionalized resins, for example (meth)acrylic ester terminated polymers, such as (meth)acrylic terminated urethane polymers or copolymers or so-called (meth)acrylic ester functionalised telechelic, dendrimeric or hyperbranched materials; and mixtures thereof.

In the first part of the composition of the invention, the total content of (meth)acrylate monomer(s) is at least 1 wt. %, preferably at least 2 wt. %, more preferably at least 3 wt. % based on the total weight of the first part of the composition. In a preferred embodiment the total content of (meth)acrylate monomer(s) is comprised from 1 wt. % to 10 wt. %, preferably from 2 wt. % to 6 wt. %, based on the total weight of the first part of the composition.

Per-Compound

The first part of the composition comprises a per-compound.

A per-compound is a compound that contains the group O—O in the structure. In the context of the present invention, the per-compound is selected from the group comprising perester, perborate, persulfate, peracetyl, or peroxide.

Suitable per-compounds are, for example, tert-butyl perbenzoate (TBPB) or tert-butyl peroxide (TBP).

Per-compounds are commercially available from companies, such as, for example, Acros Organics, or Sigma-Aldrich.

The total content of the per-compound is at least 1 wt. %, preferably it is comprised from 1 wt. % to 10 wt. %, preferably from 2 wt. % to 8 wt. %, and more preferably from 3 wt. % to 7 wt. % based on the total weight of the first part of the composition.

Additives

The first part of the composition may further contain one or more additives. Additives are selected, for example, from stabilizing agents, adhesion promoters, accelerating agents, thixotropic agents, thickening agents, toughening agents, plasticizers, antioxidants, pigments, colorants, and mixtures thereof.

In a preferred embodiment, the first part of the composition further comprises a combination of stabilizing agents, thixotropic agents, and thickening agents.

Stabilizing Agent

The first part of the composition of the invention, including the cyanoacrylate monomer(s), preferably comprises one or more stabilizing agents selected from the group consisting of radical stabilizing agents, acid stabilizing agents, and mixtures thereof. In a preferred embodiment, the first part of the composition comprises one or more stabilizing agents, in a more preferred embodiment the first part of the composition comprises a combination of a radical stabilizing agent and an acid stabilizing agent.

Radical stabilizing agents are radical polymerization inhibitors, and are preferably selected from the group consisting of 4-methoxyphenol, hydroquinone, hydroquinone monomethyl ether, hydroxytoluene butyl ether, hydroxyanisole butyl ether, 4,4'-methylenbis (2,6-di-tert-butylphenol) and mixtures thereof.

Acid stabilizing agents are inhibitors of the anionic polymerization, and may be selected from the group consisting of Bronsted acids, Lewis acids, and mixtures thereof. The acid stabilizing agent is preferably selected from the group of methanesulfonic acid, p-toluenesulfonic acid, hydrofluoric acid, boron trifluoride, boron trifluoride etherate complex, fluoroboric acid, sulphur dioxide, and mixtures thereof.

In a preferred embodiment, the first part of the composition comprises a combination of methanesulphonic acid, sulphur dioxide, boron trifluoride etherate complex, hydroquinone and hydroquinone monomethylether and 4,4'-methylenebis(2,6-di-tert-butylphenol), as stabilizing agents.

The content of radical stabilizing agent(s), in the first part of the composition, may range from 0.001 wt. % to 0.2 wt. %, preferably from 0.01 wt. % to 0.1 wt. %, and more preferably from 0.02 wt. % to 0.06 wt. % based on the total weight of the first part of the composition.

In the first part of the composition of the invention, the content of the acid stabilizing agent(s) generally ranges from 0.0003 wt. % to 0.1 wt. %, preferably from 0.001 wt. % to 0.05 wt. %, and more preferably from 0.0015 wt. % to 0.02 wt. %.

Adhesion Promoter

Typically, an adhesion promoter may be chosen from the group of aromatic carboxylic acid or anhydride, and preferably from the group consisting of trimellitic acid, trimellitic anhydride, cis-1,2,3,6-tetrahydrophthalic anhydride, pyromellitic acid, pyromellitic anhydride, dianhydride of 3,3',4,4'-benzophenonetetracarboxylic acid, itaconic acid, itaconic anhydride, 3-buten-1,2,3-tricarboxylic acid, and mixtures thereof.

The total content of adhesion promoter(s) in the first part of the composition may range from 0.02 wt. % to 0.1 wt. %, more preferably from 0.03 wt. % to 0.08 wt. % based on the total weight of the first part of the composition.

Accelerating Agent

A suitable accelerating agent or accelerator for the first part of the composition is a crown ether (for example, 15 Crown 5, 18 Crown 6, dibenzo 18 Crown 6, Alfa Aesar Co), cyclodextrins, calixarenes, and mixtures thereof. A preferred accelerating agent is dibenzo 18 Crown 6.

Typically, the content of the accelerating agent in the first part of the composition ranges from 0.01 wt. % to 0.8 wt. %, preferably from 0.05 wt. % to 0.5 wt. %, and more preferably from 0.1 wt. % to 0.3 wt. % based on the total weight of the first part of the composition.

Thixotropic Agent

A suitable thixotropic agent for the first part of the composition may be selected from the group consisting of hydrogenated castor oil, hydrogenated castor oil modified by reaction with an amine, polyamides, silica, and mixtures thereof.

Preferably, the thixotropic agent is silica, and it can be selected from the group consisting of fumed silica, hydrophobic fumed silica, hydrophilic fumed silica and precipitated silica. In a more preferred embodiment, it is hydrophobized fumed silica (for example, Aerosil® R202, Evonik).

Typically, the total content of thixotropic agent(s) in the first part of the composition may range from 2 wt. % to 10 wt. %, preferably from 3 wt. % to 8 wt. %, and more preferably from 4 wt. % to 7 wt. % based on the total weight of the first part of the composition.

Thickening Agent

A suitable thickener or thickening agent for the first part of the composition may be selected from those which are compatible with the host monomers contained therein. Examples of such thickeners include poly(meth)acrylates, acylated cellulose polymers, such as cellulose acetate, polyvinyl acetates, partially hydrolysed polyvinyl acetates, polyvinylpyrrolidones, polyoxylates, polycaprolactones, polycyanoacrylates, vinyl acetate copolymers, for example, with vinyl chloride, copolymers of (meth)acrylates with butadiene and styrene, copolymers of vinyl chloride and acrylonitrile, copolymers of ethylene and vinyl acetate, poly[butyleneterephthalate-co-polyethyleneglycolterephthalate, copolymers of lactic acid and caprolactone, and mixtures thereof.

These thickening agents are well known to the skilled in the art and have been described in the prior art.

Preferably, in the composition of the invention the thickener is selected from the group consisting of poly(meth)acrylates, polyvinylpyrrolidones, polyvinyl acetates, partially hydrolysed polyvinyl acetates, vinyl acetate copolymers, and acylated cellulose polymers. A suitable thickener for first part of the composition can be, for example, polymethylmethacrylate (for example Degacryl® M 449, Evonik), copolymers of vinyl acetate and vinyl alcohol (for example Levamelt® 900, Lanxess), copolymers of vinyl chloride and vinyl acetate (for example, Vinnol® H 40-60, Wacker), copolymers of ethylene, vinyl acetate, and esters or partial esters of maleic acid (for example, Vamac® G, DuPont), and mixtures thereof.

Typically, the content of thickener in the first part of the composition ranges from 2 wt. % to 10 wt. %, preferably from 3 wt. % to 8 wt. %, and more preferably from 4 wt. % to 7 wt. % based on the total weight of the first part of the composition.

Toughening Agent

Suitable tougheners or toughening agents for the first part of the composition are block copolymers such as, for example, polymethylmethacrylate-co-polybutylacrylate-co-polymethylmethacrylate, commercially available as Kurarity LA2140; elastomeric rubbers; elastomeric polymers; liquid elastomers; polyesters; acrylic rubbers; butadiene/acrylonitrile rubber; Buna rubber; polyisobutylene; polyisoprene; natural rubber; synthetic rubber such as styrene/butadiene rubber (SBR); polyurethane polymers; ethylene-vinyl acetate polymers; fluorinated rubbers; isoprene-acrylonitrile polymers; chlorosulfonated polyethylenes; homopolymers of polyvinyl acetate; block copolymers; core-shell rubber particles, and mixtures thereof.

Typically, the content of toughening agent in the first part of the composition ranges from 2 wt. % to 15 wt. %, preferably from 3 wt. % to 8 wt. %, and more preferably from 4 wt. % to 7 wt. % based on the total weight of the first part of the composition.

Plasticizer

Suitable plasticisers include phthalates, azelates, adipates, alkyl sebacates, acetates (for example triacetin) and non-reactive esters (for example Propane-1,2,3-triyl trisheptanoate). Preferable plasticizers are triacetin, acetyl triethyl citrate and propane-1,2,3-triyl trisheptanoate. Preferably, a plasticizing agent is not included in the first part of the composition.

Antioxidant

A suitable antioxidant for the first part of the composition may be methylenebis(4-methyl-6-tert-butylphenol) as well as hydroxyanisole butyl ether, 4-methyl-2,6-di-tert-butylphenol, hydroquinone monomethyl ether, tert-butylhydroquinone, among others, and mixtures thereof.

Typically, the content of antioxidant in the first part of the composition comprises from 0.01 wt. % to 0.8 wt. %, preferably from 0.05 wt. % to 0.5 wt. %, and more preferably from 0.1 wt. % to 0.3 wt. %.

Second Part of the Composition—Part B

The second part of the composition does not comprise any vinylic monomer.

Non-Reactive Diluent

The second part of the composition comprises a non-reactive diluent. A non-reactive diluent may be, for example, a plasticizer. In the context of the invention, the non-reactive diluent is a plasticizer selected from phthalates, citrates, azelates, adipates, sebacates, acetates (for example, triacetin) and non-reactive esters (for example, propane-1,2,3-triyl trisheptanoate).

Preferable plasticizers are triacetin, acetyl triethyl citrate and propane-1,2,3-triyl trisheptanoate.

Typically, the total content of the non-reactive diluent in the second part of the composition is at least 50 wt. % based on the total weight of the second part of the composition. It may range from 50 wt. % to 99.9 wt. %, preferably from 60 wt. % to 90 wt. %, and more preferably from 70 wt. % to 85 wt. % based on the total weight of the second part of the composition.

Transition Metal Catalyst

The second part of the composition comprises from 0.001 wt. % to 2 wt. %, of a transition metal catalyst, expressed as the content of the transition metal.

The transition metal catalyst mixed with the per-compound included in the first part of the composition produces free-radicals.

Many salts of transition metals are known to partake in so-called redox free radical initiating systems, as described by Garra et al., Prog. Pol. Sci., 2019, 94, 33, such as salts derived from Cu (II), Cu (I), Fe (III), Fe (II), Mn (II), Mn (III), Mn (IV), Ag (I), Rh (I), Rh (II), Co (II), V (III), V (IV), V (V), Cr (VI), Ti (III), Pt, and Pd.

The transition metal catalyst in the present invention is preferably a transition metal salt. The term "transition metal salt" in the context of the invention is a chemical compound consisting of an assembly of a cation of a transition metal and an anion, wherein the bond between the transition metal salt and the anion may have a character from ionic to covalent, and it includes also hydrates and solvates thereof. In a preferred embodiment, the transition metal salt is selected from $Cu(ACN)_4BF_4$, $Cu(ACN)_4PF_6$, $Cu(BF_4)_2$, Cu (II) acetate, CU (II) octoate, Cu(II) benzoate, Cu (II) chlorate, Cu (II) carbonate, Cu(II) acetylacetonate, Cu (I) trifluoromethanesulfonate, Cu (II) sulfate, Fe (II) triflate, ferrocene, Fe (II) tetrafluoroborate, $MnClO_4$, Co naphtenate, Co tetrafluoroborate. Most preferable transition metal salt is $Cu(BF_4)_2$ and hydrates and solvates thereof.

The transition metal salt may be soluble or stably suspended in the non-reactive diluent. The inclusion of thickeners, thixotropic agents or inorganic fillers may help for obtaining a stable suspension of the transition metal salt in the non-reactive diluent.

The content of transition metal catalyst in the second part of the composition, expressed as the content of the transition metal, ranges preferably from 0.005 wt. % to 0.5 wt. %, and more preferably from 0.01 wt. % to 0.03 wt. %, based on the total weight of the second part of the composition.

In the case of using a specific transition metal salt, the skilled person can calculate the corresponding amount of salt in order to have a specific amount of transition metal catalyst. For example, 0.02 wt. % of Cu(I) as transition metal catalyst, corresponds to 0.10 wt. % of transition metal salt $Cu(ACN)_4BF_4$, or 0.117 wt. % of $Cu(ACN)_4PF_6$.

Typical concentrations of transition metal catalyst in the final two-part mix range from 0.0001 wt. % to 0.2 wt. %, preferably from 0.0005 wt. % to 0.1 wt. %, more preferably from 0.0007 wt. % to 0.08 wt. %, and more preferably from 0.001 wt. % to 0.05 wt. % based on the total weight of the final two-part mix.

Electron Rich Initiating Species

The second part of the composition comprises optionally an electron rich initiating species for cyanoacrylates.

In an embodiment the second part of the composition comprises an electron rich initiating species for cyanoacrylates.

Electron rich initiator may be selected from the group consisting of organic bases, salts with a hard anion, reactive inorganic fillers, calcium, zinc and magnesium salts with organic counter anions, provided they do not comprise vinylic moieties, and mixtures thereof.

Suitable organic bases are, for example, caffeine, theobromine, 5-chloro-2-methylbenzothiazole, and tetrahydroquinolines.

Suitable salts with a hard anion are, for example, choline chloride, and benzalkonium chloride.

Suitable reactive inorganic fillers are, for example, the hydrated calcium silicate known as Promaxon® D.

Suitable calcium, zinc and magnesium salts with organic counter anions provided they do not comprise vinylic moieties are, for example, calcium stearate.

A preferred reactive inorganic filler is Promaxon® D. This compound is a hydrated calcium silicate having the chemical structure of xonotlite ($Ca_6Si_6O_{17}(OH)_2$), whose particles are substantially spherical and microporous. This product has an apparent density comprised between 85 g/l and 130 g/l, the mean particle size is comprised between 35 microns and 65 microns, and it has the CAS registry number 1344-95-2.

In a preferred embodiment, the content of the electron rich initiator in the second part of the composition is comprised from 0.05 wt. % to 3 wt. %, preferably from 0.1 wt. % to 2 wt. %, more preferably from 0.5 wt. % to 1.2 wt. % based on the total weight of the second part of the composition.

Additives

The second part of the composition may further contain one or more additives. Additives are selected, for example, thixotropic agents, thickening agents, toughening agents, accelerating agents, adhesion promoters, pigments, colorants, and mixtures thereof.

Thixotropic Agent

A suitable and preferred thixotropic agent for the second part of the composition may be selected from the group already disclosed for the thixotropic agent of the first part of the composition.

Typically, the total content of thixotropic agent(s) in the second part of the composition may range from 2 wt. % to 10 wt. %, preferably from 3 wt. % to 8 wt. %, and more preferably from 4 wt. % to 7 wt. % based on the total weight of the second part of the composition. In a preferred embodiment, the content ranges from 2 wt. % to 8 wt. % based on the total weight of the second part of the composition.

Thickening Agent

A suitable and preferred thickener or thickening agent for the second part of the composition may be selected from the group already disclosed for the thickening agent of the first part of the composition.

Typically, the content of thickener in the second part of the composition ranges from 2 wt. % to 20 wt. %, preferably from 3 wt. % to 15 wt. %, and more preferably from 4 wt. % to 13 wt. % based on the total weight of the second part of the composition. In a preferred embodiment, the content ranges from 2 wt. % to 15 wt. % based on the total weight of the second part of the composition.

Toughening Agent

A suitable toughening agent for the second part of the composition may be selected from the group already disclosed for the toughening agent of the first part of the composition.

Typically, the content of toughening agent in the second part of the composition ranges from 2 wt. % to 15 wt. %, preferably from 3 wt. % to 8 wt. %, and more preferably from 4 wt. % to 7 wt. % based on the total weight of the second part of the composition.

Accelerating Agent

A suitable accelerated agent for the second part of the composition may be selected from the group already disclosed for the accelerated agent of the first part of the composition. A preferred accelerating agent is Dibenzo 18 Crown 6.

Typically, the content of the accelerating agent in the first part of the composition ranges from 0.01 wt. % to 0.8 wt. %, preferably from 0.05 wt. % to 0.5 wt. %, and more preferably from 0.1 wt. % to 0.3 wt. % based on the total weight of the first part of the composition.

Adhesion Promoter

Suitable adhesion promoters for the second part of the composition may be selected from the group already disclosed for the adhesion promoters of the first part of the composition.

The total content of adhesion promoter(s) in the second part of the composition may range, if present from 0.01 wt. % to 0.1 wt. %, more preferably from 0.01 wt. % to 0.08 wt. % based on the total weight of the second part of the composition.

Curable Composition

The two-part curable composition may be dispensed from packages (such as two-part syringes) or from reservoir pots. The former are generally convenient for manual application. The volume ratio first part:second part ranges from 4:1 to 10:1, and more preferably is 10:1.

In a preferred embodiment, the two-part curable composition comprises:

a) a first part (Part A) comprising:
  i. from 50 wt. % to 99 wt. %, preferably from 70 wt. % to 97 wt. %, and more preferably from 85 wt. % to 95 wt. % of one or more cyanoacrylate monomer(s),
  ii. at least 1 wt. % of one or more (meth)acrylic monomer(s), and
  iii. at least 1 wt. % of a per-compound, wherein the wt. % is based on the total weight of the first part of the composition, b) a second part (Part B) comprising:
  i. from 50 wt. % to 99.9 wt. %, preferably from 60 wt. % to 90 wt. %, and more preferably from 70 wt. % to 85 wt. % of a non-reactive diluent, and
  ii. from 0.001 wt. % to 2 wt. %, preferably from 0.005 wt. % to 0.5 wt. %, and more preferably from 0.01 wt. % to 0.03 wt. % of a transition metal catalyst, expressed as the content of the transition metal, wherein the wt. % is based on the total weight of the second part of the composition, wherein the volume ratio between the first part and the second part ranges from 4:1 to 10:1, preferably 10:1, with the proviso that the second part does not comprise any vinylic monomer(s).

In a preferred embodiment, the two-part curable composition comprises:

a) a first part (Part A) comprising:
  i. at least 50 wt. %, preferably from 50 wt. % to 99.9 wt. %, preferably from 60 wt. % to 90 wt. %, and more preferably from 70 wt. % to 85 wt. % of one or more cyanoacrylate monomer(s);
  ii. from 1 wt. % to 10 wt. % of a (meth)acrylate monomer or monomers;
  iii. from 1 wt. % to 10 wt. % of a per-compound;
  iv. from 0.001 wt. % to 0.2 wt. % of stabilizing agent(s);
  v. from 2 wt. % to 10 wt. % by weight of thixotropic agent(s);
  vi. from 2 wt. % to 10 wt. % by weight of thickening agent(s);

wherein the wt. % is based on the total weight of the first part of the composition,
b) a second part (Part B) comprising:
   i. at least 50 wt. %, preferably from 50 wt. % to 99.9 wt. %, preferably from 60 wt. % to 90 wt. %, and more preferably from 70 wt. % to 85 wt. % of at least one non-reactive diluent;
   ii. from 0.001 wt. % to 2 wt. %, preferably from 0.005 wt. % to 0.5 wt. %, and more preferably from 0.01 wt. % to 0.03 wt. % of a transition metal catalyst, expressed as the content of the transition metal, and
   iii. from 0.1 wt. % to 2 wt. % of an electron rich initiator compound
   iv. from 2 wt. % to 15 wt. % of thickening agent(s);
   v. from 2 wt. % to 8 wt. % of thixotropic agent(s);
   wherein the wt. % is based on the total weight of the second part of the composition,
wherein the volume ratio between the first part and the second part ranges from 4:1 to 10:1, preferably 10:1,
with the proviso that the second part does not comprise any vinylic monomer(s).

Syringe or Cartridge

Also, part of the object of the invention is a syringe or a cartridge comprising the two-part curable cyanoacrylate composition.

Preferably the syringe or the cartridge are a syringe or a cartridge with two chambers each of different volume, one for the first part of the composition and another one for the second part of the composition.

Preferably, the syringe (or the cartridge) is a syringe (respectively a cartridge) with two chambers each of different volume, one for the first part of the composition and another one for the second part of the composition as defined above.

The first part of the composition is preferably placed in the chamber of larger volume.

The preparation of the adhesive is preferably made by the mixture of the two parts of the composition by hand pressure, or assisted by a gun, on the plungers of the syringe or the cartridge, which forces the content of the chambers to enter into the static mixer and, thus, at its outlet the adhesive of the invention is obtained. In the adhesive, the two components are advantageously intimately mixed.

The preferred mix ratio Part A:Part B range is 10:1 to 4:1 and the preferred static mixer must coincide with the selected mix ratio. Most preferably the mix ratio is 10:1.

Use of the Composition

The use of the two-part curable composition of the invention for bonding substrates also forms part of the subject-matter of the invention.

A method for bonding substrates also forms part of the subject-matter of the invention. Said method for bonding substrates comprises the steps of:
1) mixing together the two-part curable composition of the invention,
2) applying the mix of Step 1) to at least one of the substrates, and
3) mating together the substrates for a time sufficient to permit an adhesive bond to form between the mated substrates.

The use of the two-part curable composition of the invention for filling depressions, cracks or holes in a substrate or between substrates also forms part of the subject-matter of the invention.

A repair method for filling depressions, cracks or holes in a substrate or between substrates also forms part of the subject-matter of the invention. Said repair method comprises the steps of:
1) mixing together the two-part curable composition of the invention,
2) applying the mix of Step 1) into a depression, crack or hole of a substrate or on the upper part of a substrate, and optionally,
3) assembling a second substrate atop the first substrate.

The two-part adhesive composition of the invention advantageously exhibits at least one of the following properties:
A. Fast fixturing preferably lower than 1 min, more preferably lower than 35 s on multiple substrate type.
B. High bond strengths with no gap setting meaning 10-25 MPa on clean metal substrates measured 24 h after assembly, using tensile shear stress method without gap.
C. A high degree of CTV, meaning preferably 3-18 MPa on clean mild steel substrates with a 2 mm gap setting, measured 24 h after assembly, using tensile shear stress method at 2 mm gap, as disclosed in WO-A-2015/059644 (page 15, lines 5-13).
D. Resistance to submersion in hot water, gauged by bond strengths on clean ABS substrates after submersion and continuous exposure to neutral water at 60° C. for 3 days of 3-10 MPa.
E. Energy absorption meaning an integrated area under stress-strain curve for mild steel substrates bonded with 2 mm gap setting, under destructive tensile testing of equal or greater than 1 J, using the method disclosed in WO-A-2015/059644 (page 15, lines 26-27, and page 23, lines 15-16).
F. Resistance to organic solvents, as illustrated by high degrees, between 35 and 100%, of insolubility at room temperature in acetone for 24 h.
G. Excellent shelf life stability compatible with consumer market (12-24 months)

At very least, the two-part adhesive composition of the invention advantageously exhibits the following properties: A, C, F and G.

Notwithstanding previous art, no adhesive composition exhibited the four above mentioned features. Surprisingly, the two-part adhesive composition of the prevent invention did meet all these features leading to excellent durability of the final composition.

The invention comprises the following embodiments:
1.—A two-part curable composition, characterized in that it comprises:
   a) a first part (part A) comprising:
      i. at least 50 wt. % of one or more cyanoacrylate monomer(s),
      ii. at least 1 wt. % of one or more (meth)acrylic monomer(s), and
      iii. at least 1 wt. % of a per-compound,
      wherein the wt. % is based on the total weight of the first part of the composition,
   b) a second part (Part B) comprising:
      i. at least 50 wt. % of a non-reactive diluent, and
      ii. from 0.001 wt. % to 2 wt. % of a transition metal catalyst, expressed as the content of the transition metal,
      wherein the wt. % is based on the total weight of the second part of the composition,
wherein the volume ratio between the first part and the second part ranges from 4:1 to 10:1, with the proviso that the second part does not comprise any vinylic monomer(s).

2.—The two-part curable composition according to embodiment 1, characterized in that the cyanoacrylate monomer(s) are represented by the general formula (I):

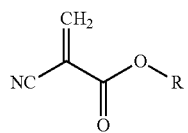

(I)

wherein R is selected from the group consisting of $C_1$-$C_{18}$ linear or branched alkyl chain, $C_3$-$C_{20}$ alkoxyalkyl, trimethylsilylated $C_1$-$C_3$ alkyl chain, furfuryl, allyl, cyclohexyl, and a group having the following formula: —$R^i$—O—C(O)—C($R^j$)=CH$_2$ with $R^i$ being an organic moiety (preferably alkylene group), and $R^j$ being H or CH$_3$.

3.—The two-part curable composition according to embodiment 2, characterized in that the cyanoacrylate monomer(s) are alkoxyalkyl cyanoacrylates defined by general formula (I), wherein R is defined by the general formula (II):

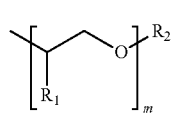

(II)

wherein $R_1$=CH$_3$ or H and $R_2$=$C_1$-$C_4$ linear or branched alkyl, and m ranges from 1 to 3.

4.—The two-part curable composition according to embodiment 2, characterized in that the cyanoacrylate monomer(s) is/are chosen from the group consisting of 2-methoxyethyl cyanoacrylate, 2-ethoxyethyl cyanoacrylate, 2-(1-methoxy)propyl cyanoacrylate, n-propyl cyanoacrylate, ethyl-2-cyanoacrylate, iso-propyl cyanoacrylate, n-butyl cyanoacrylate, sec-butyl cyanoacrylate, iso-butyl cyanoacrylate, tert-butyl cyanoacrylate, n-pentyl cyanoacrylate, 1-methylbutyl cyanoacrylate, 1-ethylpropyl cyanoacrylate, neopentyl cyanoacrylate, n-hexyl cyanoacrylate, 1-methylpentyl cyanoacrylate, n-heptyl cyanoacrylate, n-octyl cyanoacrylate, n-nonyl cyanoacrylate, n-decyl cyanoacrylate, n-undecyl cyanoacrylate, n-dodecyl cyanoacrylate, cyclohexyl cyanoacrylate, 2-(2'-methoxy)-ethoxyethyl-2"-cyanoacrylate, 2-(2'-ethoxy)-ethoxyethyl-2"-cyanoacrylate, 2-(2'-propyloxy)-ethoxyethyl-2"-cyanoacrylate, 2-(2'-butoxy)-ethoxyethyl-2"-cyanoacrylate, 2-(2'-pentyloxy)-ethoxyethyl-2"-cyanoacrylate, 2-(2'-hexyloxy)-ethoxyethyl-2"-cyanoacrylate, 2-(2'-methoxy)-propyloxypropyl-2"-cyanoacrylate, 2-(2'-ethoxy)-propyloxypropyl-2"-cyanoacrylate, 2-(2'-propyloxy)-propyloxypropyl-2"-cyanoacrylate, 2-(2'-butyloxy)-propyloxypropyl-2"-cyanoacrylate, 2-(2'-pentyloxy)-propyloxypropyl-2"-cyanoacrylate, 2-(2'-hexyloxy)-propyloxypropyl-2"-cyanoacrylate, 2-(2'-methoxy)-butyloxybutyl-2"-cyanoacrylate, 2-(2'-ethoxy)-butyloxybutyl-2"-cyanoacrylate, 2-(2'-butyloxy)-butyloxybutyl-2"-cyanoacrylate, 2-(3'-methoxy)-propyloxyethyl-2"-cyanoacrylate, 2-(3'-methoxy)-butyloxyethyl-2"-cyanoacrylate, 2-(3'-methoxy)-propyloxypropyl-2"-cyanoacrylate, 2-(3'-methoxy)-butyloxypropyl-2"-cyanoacrylate, 2-(2'-methoxy)-ethoxypropyl-2"-cyanoacrylate, 2-(2'-methoxy)-ethoxybutyl-2"-cyanoacrylate, and mixtures thereof.

5.—The two-part curable composition according to embodiment 4, characterized in that the cyanoacrylate monomer(s) is/are chosen from the group consisting of ethyl-2-cyanoacrylate, 2-methoxyethyl cyanoacrylate, and mixtures thereof.

6.—The two-part curable composition according to any one of embodiments 1 to 5, characterized in that the total content of cyanoacrylate monomer(s) ranges from 50 wt. % to 99 wt. %, preferably from 70 wt. % to 97 wt. %, and more preferably from 85 wt. % to 95 wt. % based on the total weight of the first part of the composition.

7.—The two-part curable composition according to any one of embodiments 1 to 6, characterized in that the (meth)acrylic monomer(s) of Part A of the two-part curable composition is chosen from the group consisting of:
a compound of general formula (III)

$$CH_2=CR_3(CO_2R_4) \qquad (III)$$

wherein $R_3$ represents methyl or H (preferably H), and $R_4$ is a hydrogen atom, a $C_1$-$C_8$ linear or branched alkyl, a $C_2$-$C_6$ linear or branched alkoxyalkyl, a furfuryl or an isobornyl group;
polyfunctional (meth)acrylic esters, and
mixtures thereof.

8.—The two-part curable composition according to embodiment 7, characterized in that the (meth)acrylic monomer(s) of formula (III) is/are selected from the group of methoxyethyl (meth)acrylate and ethoxyethyl (meth)acrylate.

9.—The two-part curable composition according to embodiment 7, characterized in that the (meth)acrylic monomer(s) is selected from tricyclodecane dimethanol diacrylate, ethoxylated trimethylolpropane triacrylate, 1,4-butanediol dimethacrylate, and tris-(2-hydroxyethyl) isocyanurate triacrylate.

10.—The two-part curable composition according to any one of embodiments 1 to 9, characterized in that the total content of (meth)acrylate monomer(s) is comprised from 1 wt. % to 10 wt. % based on the total weight of the first part of the composition.

11.—The two-part curable composition according to any one of embodiments 1 to 10, characterized in that the per-compound is selected from the group comprising perester, perborate, persulfate, peracetal, or peroxide.

12.—The two-part curable composition according to embodiment 11, characterized in that the per-compound is tert-butyl perbenzoate (TBPB) or tert-butyl peroxide (TBP).

13.—The two-part curable composition according to any one of embodiments 1 to 12, characterized in that the total content of the per-compound is comprised from 1 wt. % to 10 wt. %, preferably from 2 wt. % to 8 wt. %, and more preferably from 3 wt. % to 7 wt. % based on the total weight of the first part of the composition.

14.—The two-part curable composition according to any one of embodiments 1 to 13, characterized in that the first part of the composition further contains one or more additives selected from stabilizing agents, adhesion promoters, accelerating agents, thixotropic agents, thickening agents, toughening agents, plasticizers, antioxidants, pigments, colorants, and mixtures thereof.

15.—The two-part curable composition according to embodiment 14, characterized in that the first part of the composition further comprises a combination of stabilizing agents, thixotropic agents, and thickening agents.

16.—The two-part curable composition according to embodiment 14 or 15, characterized in that the first part of the composition comprises one or more stabilizing agents selected from the group consisting of radical stabilizing agents, acid stabilizing agents, and mixtures thereof.

17.—The two-part curable composition according to embodiment 16, characterized in that the first part of the composition comprises a combination of a radical stabilizing agent and an acid stabilizing agent.

18.—The two-part curable composition according to embodiment 17, characterized in that the first part of the composition comprises a combination of methanesulphonic acid, sulphur dioxide, boron trifluoride etherate complex, hydroquinone and hydroquinone monomethylether and 4,4'-methylenebis(2,6-di-tert-butylphenol), as stabilizing agents.

19.—The two-part curable composition according to any one of embodiments 1 to 18, characterized in that the non-reactive diluent is a plasticizer.

20.—The two-part curable composition according to embodiment 19, characterized in that the plasticizer is selected from phthalates, citrates, azelates, adipates, sebacates, acetates and non-reactive esters.

21.—The two-part curable composition according to embodiment 20, characterized in that the plasticizer is selected from triacetin, acetyl triethyl citrate and propane-1,2,3-triyl trisheptanoate.

22.—The two-part curable composition according to any one of embodiments 1 to 21, characterized in that the total content of the non-reactive diluent in the second part of the composition ranges from 50 wt. % to 99.9 wt. %, preferably from 60 wt. % to 90 wt. %, and more preferably from 70 wt. % to 85 wt. % based on the total weight of the second part of the composition.

23.—The two-part curable composition according to any one of embodiments 1 to 22, characterized in that the transition metal catalyst is a transition metal salt.

24.—The two-part curable composition according to embodiment 23, characterized in that the transition metal salt is selected from $Cu(ACN)_4BF_4$, $Cu(ACN)_4PF_6$, $Cu(BF_4)_2$, Cu (II) acetate, CU (II) octoate, Cu(II) benzoate, Cu (II) chlorate, Cu (II) carbonate, Cu(II) acetylacetonate, Cu (I) trifluoromethanesulfonate, Cu (II) sulfate, Fe (II) triflate, ferrocene, Fe (II) tetrafluorobotare, $MnClO_4$, Co naphtenate, Co tetrafluoroborate.

25.—The two-part curable composition according to embodiment 24, characterized in that the transition metal salt is $Cu(BF_4)_2$ or hydrates or solvates thereof.

26.—The two-part curable composition according to any one of embodiments 1 to 25, characterized in that the content of the transition metal catalyst, expressed as the content of the transition metal, ranges from 0.005 wt. % to 0.5 wt. %, and preferably from 0.01 wt. % to 0.03 wt. %, based on the total weight of the second part of the composition.

27.—The two-part curable composition according to any one of embodiments 1 to 26, characterized in that the second part of the composition comprises an electron rich initiating species for cyanoacrylates.

28.—The two-part curable composition according to embodiment 27, characterized in that the electron rich initiating species for cyanoacrylates is selected from the group consisting of organic bases, salts with a hard anion, reactive inorganic fillers, calcium, zinc and magnesium salts with organic counter anions, provided they do not comprise vinylic moieties, and mixtures thereof.

29.—The two-part curable composition according to embodiment 28, characterized in that the electron rich initiating species for cyanoacrylates is an organic base selected from caffeine, theobromine, 5-chloro-2-methylbenzothiazole, and tetrahydroquinolines.

30.—The two-part curable composition according to embodiment 28, characterized in that the electron rich initiating species for cyanoacrylates is a salt with a hard anion selected from choline chloride, and benzalkonium chloride.

31.—The two-part curable composition according to embodiment 28, characterized in that the electron rich initiating species for cyanoacrylates is a hydrated calcium silicate having the chemical structure of xonotlite as reactive inorganic filler.

32.—The two-part curable composition according to embodiment 28, characterized in that the electron rich initiating species for cyanoacrylates is a calcium, zinc and magnesium salt with organic counter anion provided it does not comprise vinylic moieties.

33.—The two-part curable composition according to any one of embodiments 1 to 32, characterized in that the content of the electron rich initiator is comprised from 0.05 wt. % to 3 wt. %, preferably from 0.1 wt. % to 2 wt. %, more preferably from 0.5 wt. % to 1.2 wt. % based on the total weight of the second part of the composition.

34.—The two-part curable composition according to any one of embodiments 1 to 33, characterized in that the second part of the composition further contains one or more additives are selected from thixotropic agents, thickening agents, toughening agents, accelerating agents, adhesion promoters, pigments, colorants, and mixtures thereof.

35.—The two-part curable composition according to any one of embodiments 1 to 34, characterized in that the volume ratio between the first part and the second part is 10:1.

36.—The two-part curable composition according to embodiment 1, characterized in that it comprises:
a) a first part (Part A) comprising:
  i. from 50 wt. % to 99 wt. %, preferably from 70 wt. % to 97 wt. %, and more preferably from 85 wt. % to 95 wt. % of one or more cyanoacrylate monomer(s),
  ii. at least 1 wt. % of one or more (meth)acrylic monomer(s), and
  iii. at least 1 wt. % of a per-compound,
wherein the wt. % is based on the total weight of the first part of the composition,
b) a second part (Part B) comprising:
  i. from 50 wt. % to 99.9 wt. %, preferably from 60 wt. % to 90 wt. %, and more preferably from 70 wt. % to 85 wt. % of a non-reactive diluent, and
  ii. from 0.001 wt. % to 2 wt. %, preferably from 0.005 wt. % to 0.5 wt. %, and more preferably from 0.01 wt. % to 0.03 wt. % of a transition metal catalyst, expressed as the content of the transition metal,
wherein the wt. % is based on the total weight of the second part of the composition,
wherein the volume ratio between the first part and the second part ranges from 4:1 to 10:1, preferably 10:1, with the proviso that the second part does not comprise any vinylic monomer(s).

37.—The two-part curable composition according to embodiment 1, characterized in that it comprises:
a) a first part (Part A) comprising:
   i. at least 50 wt. %, preferably from 50 wt. % to 99.9 wt. %, preferably from 60 wt. % to 90 wt. %, and more preferably from 70 wt. % to 85 wt. % of one or more cyanoacrylate monomer(s);
   ii. from 1 wt. % to 10 wt. % of a (meth)acrylate monomer or monomers;
   iii. from 1 wt. % to 10 wt. % of a per-compound;
   iv. from 0.001 wt. % to 0.2 wt. % of stabilizing agent(s);
   v. from 2 wt. % to 10 wt. % by weight of thixotropic agent(s);
   vi. from 2 wt. % to 10 wt. % by weight of thickening agent(s);
   wherein the wt. % is based on the total weight of the first part of the composition,
b) a second part (Part B) comprising:
   i. at least 50 wt. %, preferably from 50 wt. % to 99.9 wt. %, preferably from 60 wt. % to 90 wt. %, and more preferably from 70 wt. % to 85 wt. % of at least one non-reactive diluent;
   ii. from 0.001 wt. % to 2 wt. %, preferably from 0.005 wt. % to 0.5 wt. %, and more preferably from 0.01 wt. % to 0.03 wt. % of a transition metal catalyst, expressed as the content of the transition metal, and
   iii. from 0.1 wt. % to 2 wt. % of an electron rich initiator compound
   iv. from 2 wt. % to 15 wt. % of thickening agent(s);
   v. from 2 wt. % to 8 wt. % of thixotropic agent(s);
   wherein the wt. % is based on the total weight of the second part of the composition,
wherein the volume ratio between the first part and the second part ranges from 4:1 to 10:1, preferably 10:1, with the proviso that the second part does not comprise any vinylic monomer(s).

38.—A syringe or a cartridge comprising the two-part curable cyanoacrylate composition of any one of embodiments 1 to 37.

39.—The use of the two-part curable composition of any one of embodiments 1 to 37 for bonding substrates.

40.—The use of the two-part curable composition of any one of embodiments 1 to 37 for filling depressions, cracks or holes in a substrate or between substrates 41.—A method for bonding substrates, characterized in that it comprises the steps of:
1) mixing together the two-part curable composition of any one of embodiments 1 to 37,
2) applying the mix of Step 1) to at least one of the substrates, and
3) mating together the substrates for a time sufficient to permit an adhesive bond to form between the mated substrates.

42.—A repair method for filling depressions, cracks or holes in a substrate or between substrates, characterized in that it comprises the steps of:
1) mixing together the two-part curable composition of any one of embodiments 1 to 37,
2) applying the mix of Step 1) into a depression, crack or hole of a substrate or on the upper part of a substrate, and optionally,
3) assembling a second substrate atop the first substrate.

EXAMPLES

The following methods were used to assess the performance of the claimed compositions.

Fixture time (FT) is the time at which an adhesive bond (250 mm2) is capable of supporting a 3 kg load for 10 seconds at room temperature (23±2° C.) under 50% RH.

Testing for resistance is measured on bulk cured polymers (0.3 g) after immersing samples for 24 hours in acetone (20 mL). The insoluble part is filtered and dried at 60° C. to constant mass and compared to the original mass or the cured material.

Tensile shear test data reflect bond strength measured in MPa after assembling overlapping lapshear (standard test pieces) parts with a contact area of 25 $mm^2$, measured according to ASTM D1002 bonded lapshears rested for 24 h after assembly before testing. Testing for hot water resistance is done on assembled samples exposed to submersion in hot water (at 60° C.) for 3 days.

The following ingredients were used in the examples:

ECA (ethyl cyanoacrylate) marketed by Cartell Chemical Co. Ltd.

MECA (methoxyethyl cyanoacrylate) marketed by Cartell Chemical Co. Ltd.

$SO_2$ marketed by Carburos Metalicos, S.A.

Sartomer® CN1964CG (low molecular weight urethane dimethacrylate oligomer) marketed by Arkema Sartomer® SR214 (1,4-butanediol dimethacrylate) marketed by Arkema Sartomer® SR368 (tris-(2-hydroxyethyl)isocyanurate triacrylate) marketed by Arkema Sartomer® SR454 (ethoxylated trimethylolpropane triacrylate) marketed by Arkema Sartomer® SR833S (tricyclodecane dimethanol diacrylate) marketed by Arkema PMMA (polymethylmethacrylate) Degacryl® 449, marketed by Evonik Polymethylmethacrylate-co-polybutylacrylate-co-polymethylmethacrylate Kurarity® LA2140, marketed by Kuraray Europe Promaxon® D (hydrated calcium silicate inorganic filler of xonolithe structure), marketed by Lapinus Fibers GTA (triacetin), marketed by Oleon GTH (propane-1,2,3-triyl trisheptanoate), marketed by Oleon FS (hydrophobic fumed silica) Aerosil® R202, marketed by Evonik EBECRYL® 1259, (acrylated aliphatic urethane oligomer), marketed by Allnex.

The following products were obtained from Sigma Aldrich Merck:

Methane sulphonic acid, Fe (II)Triflate, Cu(I)$(ACN)_4BF_4$, TBPB (tert-butyl peroxy benzoate), Cu (II)$(BF_4)_2$.

Examples 1.1 to 1.6: Two-Part Curable Compositions

Compositions of Part A are outlined in Table 1 and for Part B in Table 2. Content is expressed as wt. % based on the total weight of the respective Part A and Part B compositions.

Adhesives were produced by mixing Part A with Part B at 10:1 (A:B) mix ratio using a Sulzer Mixpac syringe and appropriate static mixer. In all these examples a Cu (I) salt was the transition metal catalyst and the calcium silicate known as Promaxon® D was the electron rich initiator for cyanoacrylates.

TABLE 1

| Component | 1.1.A | 1.2.A | 1.3.A | 1.4.A | 1.5.A | 1.6.A |
|---|---|---|---|---|---|---|
| MECA | 80.99815 | — | 77.99815 | 77.99815 | 77.99815 | 77.99815 |
| ECA | — | 80.99815 | — | — | — | — |
| MSA | 0.00085 | 0.00085 | 0.00085 | 0.00085 | 0.00085 | 0.00085 |
| SO$_2$ | 0.001 | 0.001 | 0.001 | 0.001 | 0.001 | 0.001 |
| PMMA | 6 | 6 | 6 | 6 | 6 | 6 |
| FS | 6 | 6 | 6 | 6 | 6 | 6 |
| TBPB | 5 | 5 | 5 | 5 | 5 | 5 |
| SR454 | 2 | 2 | — | — | — | — |
| EBECRYL ® 1259 | — | — | 5 | — | — | — |
| CN1964CG | — | — | — | 5 | — | — |
| SR368 | — | — | — | — | 5 | — |
| SR833S | — | — | — | — | — | 5 |

TABLE 2

| | Example | | | | | |
|---|---|---|---|---|---|---|
| | 1.1.B | 1.2.B | 1.3.B | 1.4.B | 1.5.B | 1.6.B |
| GTA | 85.8 | 85.8 | 85.8 | 85.8 | 85.8 | 85.8 |
| Cu(I)(ACN)$_4$BF$_4$ | 0.1 | 0.1 | 0.1 | 0.1 | 0.1 | 0.1 |
| Kurarity ® LA2140 | 13.6 | 13.6 | 13.6 | 13.6 | 13.6 | 13.6 |
| Promaxon ® D | 0.5 | 0.5 | 0.5 | 0.5 | 0.5 | 0.5 |

Examples 2.1 to 2.3: Two-Part Curable Compositions

Further Part A and Part B compositions are outlined in Table 3 and Table 4 respectively. Content is expressed as wt. % based on the total weight of the respective Part A and Part B compositions.

Adhesives were produced in the same way as described in Example 1. In these examples different transition metal salt catalysts were chosen and used with or without the illustrative calcium silicate initiator (Promaxon® D) for cyanoacrylates. Adhesives were produced by mixing Part A with Part B at 10:1 (A:B) mix ratio using a Sulzer Mixpac syringe and appropriate static mixer.

TABLE 3

| | Example | | |
|---|---|---|---|
| | 2.1.A | 2.2.A | 2.3.A |
| MECA | 83.99815 | 83.99815 | 83.99815 |
| MSA | 0.00085 | 0.00085 | 0.00085 |
| SO$_2$ | 0.001 | 0.001 | 0.001 |
| PMMA | 4 | 4 | 4 |
| FS | 5 | 5 | 5 |
| TBPB | 5 | 5 | 5 |
| SR454 | 2 | 2 | 2 |

TABLE 4

| | Example | | |
|---|---|---|---|
| | 2.1.B | 2.2.B | 2.3.B |
| GTA | — | 81.3 | 82.3 |
| GTH | 99.05 | — | — |
| Fe (II)Triflate | 0.95 | — | — |
| Cu (II)(BF$_4$)$_2$ | — | 0.1 | 0.1 |
| Kurarity ® LA2140 | — | 13.6 | 13.6 |

TABLE 4-continued

| | Example | | |
|---|---|---|---|
| | 2.1.B | 2.2.B | 2.3.B |
| Promaxon ® D | — | 1 | — |
| FS | — | 4 | 4 |

Comparative Example 3: Two-Part Cyanoacrylate Composition

Comparative two-part cyanoacrylate compositions are outlined in Table 5 and Table 6 as Part A and Part B respectively. Content is expressed as wt. % based on the total weight of the respective Part A and Part B compositions.

Composition 3.3.A and 3.3.B corresponds to a commercial product from the LOCTITE® range, and the information on the composition was available through the MSDS data.

Composition 3.4.A and 3.4.B corresponds to the Example of WO-A-2013/111036 disclosed in Table 1 and Table 2.

Adhesives were produced in the same way as described in Example 1. In these examples the per-compound was missing from Part A.

TABLE 5

| | Example | | | |
|---|---|---|---|---|
| | 3.1.A | 3.2.A. | 3.3.A | 3.4.A |
| MECA | 80.99815 | 85.99815 | — | — |
| ECA | — | — | 60-80 | 94.995 |
| Ethylene-vinyl acetate copolymer | — | — | 10-30 | — |
| MSA | 0.00085 | 0.00085 | not specified | — |
| SO$_2$ | 0.001 | 0.001 | not specified | — |
| BF$_3$ | — | — | not specified | 0.005 |
| PMMA | 6 | 6 | not specified | — |
| FS | 6 | 6 | not specified | — |
| TBPB | 5 | — | 5-10 | 5 |
| SR454 | 2 | 2 | — | — |
| Others | — | — | <25 | — |

TABLE 6

| | Example | | | |
|---|---|---|---|---|
| | 3.1.B | 3.2.B | 3.3.B | 3.4.B |
| Multifunctional acrylate | — | — | >55.1 | — |
| TRIEGMA* | — | — | — | 99 |
| SR214 | 99.8 | — | — | — |
| Cu (II)(BF$_4$)$_2$ | 0.2 | — | 1 | — |
| Cu (II)(BF$_4$)$_2$·H$_2$O | — | — | — | 1 |
| Cu(I)(ACN)$_4$BF$_4$ | — | 0.1 | — | — |
| GTA | — | 85.8 | — | — |
| Kurarity ® LA2140 | — | 13.6 | — | — |
| Promaxon ® D | — | 0.5 | — | — |

*TRIEGMA: triethylene glycol dimethacrylate 2K adhesive packaged in 10:1 syringes comprising Part A of Comparative example 3.1 and Part B of Comparative Example 3.1 could not be used after 4 months storage at room temperature since Part B was unstable due to the combination of a transition metal catalyst with a vinylic component.

2K adhesive obtained from mixing a ratio of Part A:Part B=10:1 of Comparative example 3.2 was tested as shown in Example 4.

2K adhesive obtained from mixing a ratio of Part A:Part B=1:1 of Comparative Example 3.3 and 3.4 were tested as shown in Example 4.

Example 4: Testing of Two-Part Cyanoacrylate Adhesives

Table 7 illustrates that adhesives derived from compositions described in examples 1.1, 1.2, 1.3, 1.4, 1.5 and 1.6 show high degree of insolubility in acetone after 24 hr soaking illustrating that crosslinking has occurred due to the reaction of the per-compound with the copper based transition metal salt reaction leading to the free-radical generation and copolymerisation of bulk cyanoacrylate with the small concentration of multifunctional (meth)acrylate present. The free-radical reaction that gives rise to the desirable solvent resistance and durability due to crosslinking, does not impede the ability of the adhesives to produce the fast fixturing and cure of traditional superglues.

On the contrary when per-compound is absent as in Comparative example 3.2 no such insolubility occurred and the adhesive is not crosslinked and readily dissolved.

Fast fixturing of the compositions was observed (<1 min) even in the presence of several different (meth)acrylic crosslinkers. As commercial product, Comparative example 3.3, and 2K adhesive from WO-A-2013/111036, Comparative example 3.4, do perform in terms of durability (high insolubility due to crosslinking) but fail to show fast fixturing (≥10 minutes).

Table 8 shows the results obtained with comparative examples 3.2-3.4.

TABLE 7

| | Examples Mixing ratio Part A:Part B = 10:1 | | | | | |
|---|---|---|---|---|---|---|
| | 1.1 | 1.2 | 1.3 | 1.4 | 1.5 | 1.6 |
| FT(MS) | 30 s | 30 s | 30 s | 90 s | 15 s | 15 s |
| FT(ABS) | 60 s | 60 s | 60 s | — | 45 s | 60 s |
| Insolubility 24 h (acetone) | 58% | 58% | 46% | 40% | 64% | 54% |

TABLE 8

| | Example | | |
|---|---|---|---|
| | 3.2 | 3.3 | 3.4 |
| FT (Mild Steel) | 30 s | 12 min | >15 min |
| FT(ABS) | 60 s | >20 min | 10 min |
| Insolubility 24 h (acetone) | 0% | 100% | 95% |

Example 5: Testing of Two-Part Cyanoacrylate Adhesives

Table 10 illustrates that adhesives, obtained by mixing part A and part B of the compositions described in examples 2.1-2.3, show high degree of insolubility in acetone after 24 hr soaking (from 76% to 89%), supporting that crosslinking has occurred due to the reaction of the per-compound with the transition metal catalyst leading to the free-radical generation and copolymerisation of bulk cyanoacrylate with the small concentration of multifunctional (meth)acrylate present.

Table 10 also illustrates the effect of combining an electron rich initiator for cyanoacrylates (e.g. PROMAXON® D present in Part B for Adhesive 2.2, and absent in Part B for Adhesive 2.3) with the transition metal catalyst in Part B. When both are included in the composition, that is used together, then the adhesive shows the fast fixturing of a regular superglue (30 sec on Mild Steel), bulk cure in a relatively short period (1 hour) and durability evidenced by solvent resistance producing high degrees of insolubility towards acetone derived from crosslinking and copolymerisation of cyanoacrylate with concentrations of a multifunctional acrylate, ethoxylated trimethylolpropane triacrylate (SR454) that alone if crosslinked cannot account for the illustrated insolubility.

TABLE 10

| | Examples Mixing ratio Part A:Part B = 10:1 | | |
|---|---|---|---|
| | 2.1 | 2.2 | 2.3 |
| Bulk cure time (h) | — | 1 | 8 |
| FT (Mild Steel) | — | 30 s | 60 s |
| FT(ABS) | — | 105 s | >120 s |
| Insolubility 24 h (acetone) | 89% | 76% | 89% |

The invention claimed is:

1. A two-part curable composition, characterized in that it comprises:
   a) a first part (part A) comprising:
      i. at least 50 wt. % of one or more cyanoacrylate monomer(s),
      ii. at least 1 wt. % of one or more (meth)acrylic monomer(s), and
      iii. at least 1 wt. % of a per-compound,
      wherein the wt. % is based on the total weight of the first part of the composition,
   b) a second part (part B) comprising:
      i. at least 50 wt. % of a non-reactive diluent, and
      ii. from 0.001 wt. % to 2 wt. % of a transition metal catalyst, expressed as the content of the transition metal,
      wherein the wt. % is based on the total weight of the second part of the composition, wherein the volume ratio between the first part and the second part ranges from 4:1 to 10:1, with the proviso that the second part does not comprise any vinylic monomer(s).

2. The two-part curable composition according to claim 1, characterized in that the (meth)acrylic monomer(s) of Part A of the two-part curable composition is selected from the group consisting of:
i. a compound of general formula (III)

wherein $R_3$ represents methyl or H, and $R_4$ is a hydrogen atom, a $C_1$-$C_8$ linear or branched alkyl, a $C_2$-$C_6$ linear or branched alkoxyalkyl, a furfuryl or an isobornyl group;
ii. polyfunctional (meth)acrylic esters, and
iii. mixtures thereof.

3. The two-part curable composition according to claim 1, characterized in that the first part of the composition further contains one or more additives selected from the group consisting of stabilizing agents, adhesion promoters, accelerating agents, thixotropic agents, thickening agents, toughening agents, plasticizers, antioxidants, pigments, colorants, and mixtures thereof.

4. The two-part curable composition according to claim 3, characterized in that the first part of the composition comprises one or more stabilizing agents selected from the group consisting of radical stabilizing agents, acid stabilizing agents, and mixtures thereof.

5. The two-part curable composition according to claim 1, characterized in that the non-reactive diluent is a plasticizer.

6. The two-part curable composition according to claim 1, characterized in that the transition metal catalyst is a transition metal salt.

7. The two-part curable composition according to claim 6, characterized in that the transition metal salt is selected from the group consisting of $Cu(ACN)_4BF_4$, $Cu(ACN)_4PF_6$, $Cu(BF_4)_2$, Cu (II) acetate, CU (II) octoate, Cu(II) benzoate, Cu (II) chlorate, Cu (II) carbonate, Cu(II) acetylacetonate, Cu (I) trifluoromethanesulfonate, Cu (II) sulfate, Fe (II) triflate, ferrocene, Fe (II) tetrafluorobotare, $MnClO_4$, Co naphtenate, and Co tetrafluoroborate.

8. The two-part curable composition according to claim 1, characterized in that the second part of the composition comprises an electron rich initiating species for cyanoacrylates.

9. The two-part curable composition according to claim 1, characterized in that the (meth)acrylic monomer(s) of Part A of the two-part curable composition is selected from the group consisting of:
a compound of general formula (III)

wherein $R_3$ represents methyl or H, and $R_4$ is a hydrogen atom, a $C_1$-$C_8$ linear or branched alkyl, a $C_2$-$C_6$ linear or branched alkoxyalkyl, a furfuryl or an isobornyl group;
a polyfunctional (meth)acrylic ester selected from the group consisting of butanediol di(meth)acrylate, hexanediol di(meth)acrylate, diethylene glycol di(meth)acrylate, triethyleneglycol di(meth)acrylate, polyethylene glycol di(meth)acrylate, triethylene oxide dimethacrylate, tris-(2-hydroxyethyl) isocyanurate triacrylate, tricyclodecane dimethanol diacrylate, trimethylolpropane tri(meth)acrylate (TMPTA), ethoxylated trimethylolpropane tri(meth)acrylate, neopentylglycol diacrylate, pentaerythritol tetraacrylate (PETA), pentaerythritol tetramethacrylate (PETMA), dipentaerythritol penta(meth)acrylate, dipentaerythritol hexa(meth)acrylate, bisphenol-A-diacrylate, bisphenol-A-dimethacrylate, ethoxylated bisphenol-A-diacrylate, propoxylated bisphenol-A-diacrylate, and mixtures thereof; (meth)acrylic functionalized oligomers and (meth)acrylic functionalized resins; and
mixtures thereof.

10. The two-part curable composition according to claim 1, characterized in that the (meth)acrylic monomer(s) of Part A of the two-part curable composition is selected from the group consisting of:
a compound of general formula (III)

wherein $R_3$ represents methyl or H, and $R_4$ is a hydrogen atom, a $C_1$-$C_8$ linear or branched alkyl, a $C_2$-$C_6$ linear or branched alkoxyalkyl, a furfuryl or an isobornyl group;
a polyfunctional (meth)acrylic ester selected from the group consisting of butanediol di(meth)acrylate, hexanediol di(meth)acrylate, diethylene glycol di(meth)acrylate, triethyleneglycol di(meth)acrylate, polyethylene glycol di(meth)acrylate, triethylene oxide dimethacrylate, tris-(2-hydroxyethyl) isocyanurate triacrylate, tricyclodecane dimethanol diacrylate, trimethylolpropane tri(meth)acrylate (TMPTA), ethoxylated trimethylolpropane tri(meth)acrylate, neopentylglycol diacrylate, pentaerythritol tetraacrylate (PETA), pentaerythritol tetramethacrylate (PETMA), dipentaerythritol penta(meth)acrylate, dipentaerythritol hexa(meth)acrylate, bisphenol-A-diacrylate, bisphenol-A-dimethacrylate, ethoxylated bisphenol-A-diacrylate, propoxylated bisphenol-A-diacrylate, and mixtures thereof; and
mixtures thereof.

11. The two-part curable composition according to claim 1, characterized in that it comprises:
a) a first part (Part A) comprising:
i. from 50 wt. % to 99 wt. % of one or more cyanoacrylate monomer(s),
ii. at least 1 wt. % of one or more (meth)acrylic monomer(s), and
iii. at least 1 wt. % of a per-compound,
wherein the wt. % is based on the total weight of the first part of the composition,
b) a second part (Part B) comprising:
i. from 50 wt. % to 99.9 wt. %, of a non-reactive diluent, and
ii. from 0.001 wt. % to 2 wt. % of a transition metal catalyst, expressed as the content of the transition metal,
wherein the wt. % is based on the total weight of the second part of the composition, wherein the volume ratio between the first part and the second part ranges from 4:1 to 10:1, with the proviso that the second part does not comprise any vinylic monomer(s).

12. The two-part curable composition according to claim 1, characterized in that it comprises:
a) a first part (Part A) comprising:
i. at least 50 wt. % of one or more cyanoacrylate monomer(s);
ii. from 1 wt. % to 10 wt. % of a (meth)acrylate monomer or monomers;
iii. from 1 wt. % to 10 wt. % of a per-compound;
iv. from 0.001 wt. % to 0.2 wt. % of stabilizing agent(s);
v. from 2 wt. % to 10 wt. % by weight of thixotropic agent(s); and vi. from 2 wt. % to 10 wt. % by weight of thickening agent(s);

wherein the wt. % is based on the total weight of the first part of the composition, b) a second part (Part B) comprising:
   i. at least 50 wt. % of at least one non-reactive diluent;
   ii. from 0.001 wt. % to 2 wt. % of a transition metal catalyst, expressed as the content of the transition metal,
   iii. from 0.1 wt. % to 2 wt. % of an electron rich initiator compound;
   iv. from 2 wt. % to 15 wt. % of thickening agent(s); and
   v. from 2 wt. % to 8 wt. % of thixotropic agent(s);

wherein the wt. % is based on the total weight of the second part of the composition, wherein the volume ratio between the first part and the second part ranges from 4:1 to 10:1, with the proviso that the second part does not comprise any vinylic monomer(s).

13. A syringe or a cartridge comprising the two-part curable cyanoacrylate composition of claim 1.

14. A method for bonding substrates, characterized in that it comprises the steps of:
1) mixing together the two-part curable composition of claim 1,
2) applying the mix of Step 1) to at least one of the substrates, and
3) mating together the substrates for a time sufficient to permit an adhesive bond to form between the mated substrates.

15. A repair method for filling depressions, cracks or holes in a substrate or between substrates, characterized in that it comprises the steps of:
1) mixing together the two-part curable composition of claim 1,
2) applying the mix of Step 1) into a depression, crack or hole of a substrate or on the upper part of a substrate, and optionally,
3) assembling a second substrate atop the first substrate.

* * * * *